United States Patent [19]

Sewón

[11] Patent Number: 4,883,679

[45] Date of Patent: Nov. 28, 1989

[54] BRINE FOR CONSERVING CUCUMBER

[76] Inventor: Pentti K. Sewón, Pirttilähdevägen 11, Åbo, Finland, SF-20310

[21] Appl. No.: 219,007

[22] Filed: Jul. 14, 1988

[51] Int. Cl.$^4$ .............................................. A23B 7/10
[52] U.S. Cl. ................................... 426/532; 426/321; 426/335; 426/654
[58] Field of Search ................ 426/532, 321, 335, 654

[56] References Cited

U.S. PATENT DOCUMENTS

| | | | |
|---|---|---|---|
| 4,369,197 | 1/1983 | Basel et al. ...................... | 426/615 X |
| 4,477,478 | 10/1984 | Tiberio et al. ................... | 426/532 X |
| 4,756,919 | 7/1988 | Cirigiano et al. ............... | 426/532 X |

OTHER PUBLICATIONS

Dialog Acc. No. 115696, File 51: FSTA, Abstracting Shoup, Dissertation Abstracts International, B, 1975, 36, (6), 2701: Order No. 75-26662.
Dialog Acc. No. 106656, File 51: FSTA, Abstracting Shoup et al, Journal of Food Science, 1975, 40, (4), 689-691.

*Primary Examiner*—Joseph Golian
*Attorney, Agent, or Firm*—Thomas R. Vigil; James P. Hanrath

[57] ABSTRACT

The invention relates to a brine for conserving cucumber in bulk making fermentation unnecessary. The brine according to the invention is an aqueous solution containing per liter of the solution: at least 0.15 kg sodium chloride, 0.01–0.05 kg. acetic or lactic acid or a non-toxic salt thereof, at least 1 g each of sodium benzoate, calcium chloride, and potassium sorbate and at least 50 mg each of ascorbic acid and citric acid. The taste and crispiness of a product processed from cucumbers stored in this brine for an extended period are equal to that of fresh packed cucumbers.

2 Claims, No Drawings

BRINE FOR CONSERVING CUCUMBER

The present invention relates to cucumber conservation and especially a brine for conserving cucumber in bulk.

Cucumbers may be pickled and canned directly after harvest as so called "fresh packs" resulting in pickled cucumbers having a good taste and crispy consistency. The processing of cucumbers to produce fresh packs is also very uncomplicated including essentially only putting sorted and picked cucumbers into cans or jars, adding the pickling solution, closing the cans or jars, and finally heat treating the closed cans or jars to pasteurize their content. The drawback of this procedurre is that it requires a very big processing capacity during the relatively short harvest period.

In order to overcome this drawback and enable processing huge quantities of cucumbers during an extented period with less personnel and processing equipment part of the harvest is conventionally fermented and stored in bulk in large silos. From these silos cucumbers are withdrawn at a desired rate for processing in a conventional manner.

Without discussing in detail different known fermentation procedures one may in general contend that the pickled cucumbers processed from such fermented bulk products are not of the same high quality as those of fresh packed cucumbers. The controlling of the fermentation process to obtain an even quality is also difficult and the yield, taste and consistency of the pickled cucumbers are not so good as for fresh packs.

The object of the present invention is thus to provide a brine for conserving cucumbers in bulk without the necessity of fermenting the cucumbers. The present invention replaces the previous known fermentation processes used for conserving cucumber in bulk before processing to pickled cucumbers in consumer packages. The present invention enables obtaining pickled cucumbeers of substantially the same high quality as by fresh packing but with the same personnel and capital investments as with the known fermentation processes used for storing the cucumbers in bulk awaiting processing for canning.

According to the present invention cucumbers are conserved in bulk by submerging the same in a brine containing in solution at least about 0.15 kg NaCl, 0.01–0.05 kg acetic or lactic acid or a non-toxic salt thereof, at least 1 g Na-benzoate, at least 1 g K-sorbate, at least 1 g $CaCl_2$, at least 50 mg ascorbic acid, and at least 50 mg citric acid per liter of said brine solution. When only the lower limit is given, it should be understood that the upper limit is set by the solubility of respective ingredient in the brine solution.

EXAMPLE

Assorted cucumbers of various size were washed and picked shortly after harvest. The cucumbers were then stored in silos for about 2 months immersed in about the same volume of an aqueous brine solution representing a preferred embodiment of the invention and containing per liter of said aqueous solution: 0.3 kg NaCl, 0.024 kg acetic acid, 3.5 g Na-benzoate, 3.5 g $CaCl_2$, 2.5 g K-sorbate, 400 mg ascorbic acid and 400 mg citric acid.

After this period the brine was withdrawn and the stored cucumbers were leached with water to reduce the level of the salt concentration brine therein below 2% by weight. Then the leached cucumbers were put into cans or jars together with a spiced pickling solution containing conventional pickling ingredients such as sweeteners, vinegar, salt and spices. Finally the cans or jars are hermetically closed and heated to pasteurize their contents.

It was observed that bigger cucumbers could be used than in the above fermentation processes and that the cucumbers so conserved and processed were crispy and of the same high quality as those obtained by fresh packing cucumbers although the cucumbers had been stored for an extended period in bulk before processing.

I claim:
1. Brine for conserving cucumber in bulk, comprising in solution per liter of the brine: at least 0.15 kg sodium chloride, 0.01–0.05 kg acetic or lactic acid or a non-toxic salt thereof, at least 1 g each of sodium benzoate, calcium chloride, and potassium sorbate, and at least 50 mg each of ascorbic acid and citric acid.

2. The brine of claim 1, comprising per liter of aqueous solution:

| | |
|---|---|
| 0.3 kg | sodium chloride |
| 0.024 kg | acetic acid |
| 3.5 g | sodium benzoate |
| 3.5 g | calcium chloride |
| 2.5 g | potassium sorbate |
| 400 mg | ascorbic acid |
| 400 mg | citric acid. |

* * * * *